United States Patent [19]

Baumgartner et al.

[11] Patent Number: 5,568,845
[45] Date of Patent: Oct. 29, 1996

[54] PNEUMATICALLY OPERATED DISK BRAKE

[75] Inventors: Hans Baumgartner, Moosburg; Dieter Bieker, Munich; Johann Iraschko, Reisdorf, all of Germany

[73] Assignee: Knorr Bremse AG, Munich, Germany

[21] Appl. No.: 553,829

[22] Filed: Nov. 6, 1995

Related U.S. Application Data

[63] Continuation of Ser. No. 295,420, Aug. 25, 1994, abandoned.

[30] Foreign Application Priority Data

Oct. 13, 1993 [DE] Germany .......................... 43 34 914.5

[51] Int. Cl.⁶ .................................................. F16D 65/52
[52] U.S. Cl. ...................................... 188/71.9; 188/196 D
[58] Field of Search ................................. 188/71.9, 71.8, 188/71.7, 369, 196 D, 196 F

[56] References Cited

U.S. PATENT DOCUMENTS

| | | | |
|---|---|---|---|
| 3,498,423 | 3/1970 | Belart | 188/71.9 |
| 3,999,638 | 12/1976 | Margetts | 188/196 D |
| 4,598,801 | 7/1986 | Villata | 188/71.9 |
| 5,353,896 | 10/1994 | Baumgartner et al. | 188/71.9 |
| 5,379,867 | 1/1995 | Macke et al. | 188/71.9 |

FOREIGN PATENT DOCUMENTS

| | | |
|---|---|---|
| 3716202 | 11/1988 | Germany . |
| 4032885 | 4/1992 | Germany . |
| 4212384 | 10/1993 | Germany . |
| 4308704 | 9/1994 | Germany . |

*Primary Examiner*—Matthew C. Graham
*Attorney, Agent, or Firm*—Barnes & Thornburg

[57] ABSTRACT

A pneumatically operated disk brake having a caliper actuated by an application through a traverse member which is displaceably guided with respect to the brake disk, at least one adjusting spindle is adjustably screwed to the traverse member and an adjusting device acts upon the adjusting spindle to maintain a desired ventilating play. A device is provided which prevents any rotating of the threaded spindle up to a specified torque. For a two spindle device the synchronization device can be locked in the released condition of the brake. Another solution is to provide on each adjusting spindle its brake-disk-side end a frontal toothing which engages in a corresponding frontal countertoothing of its pressure piece.

5 Claims, 9 Drawing Sheets

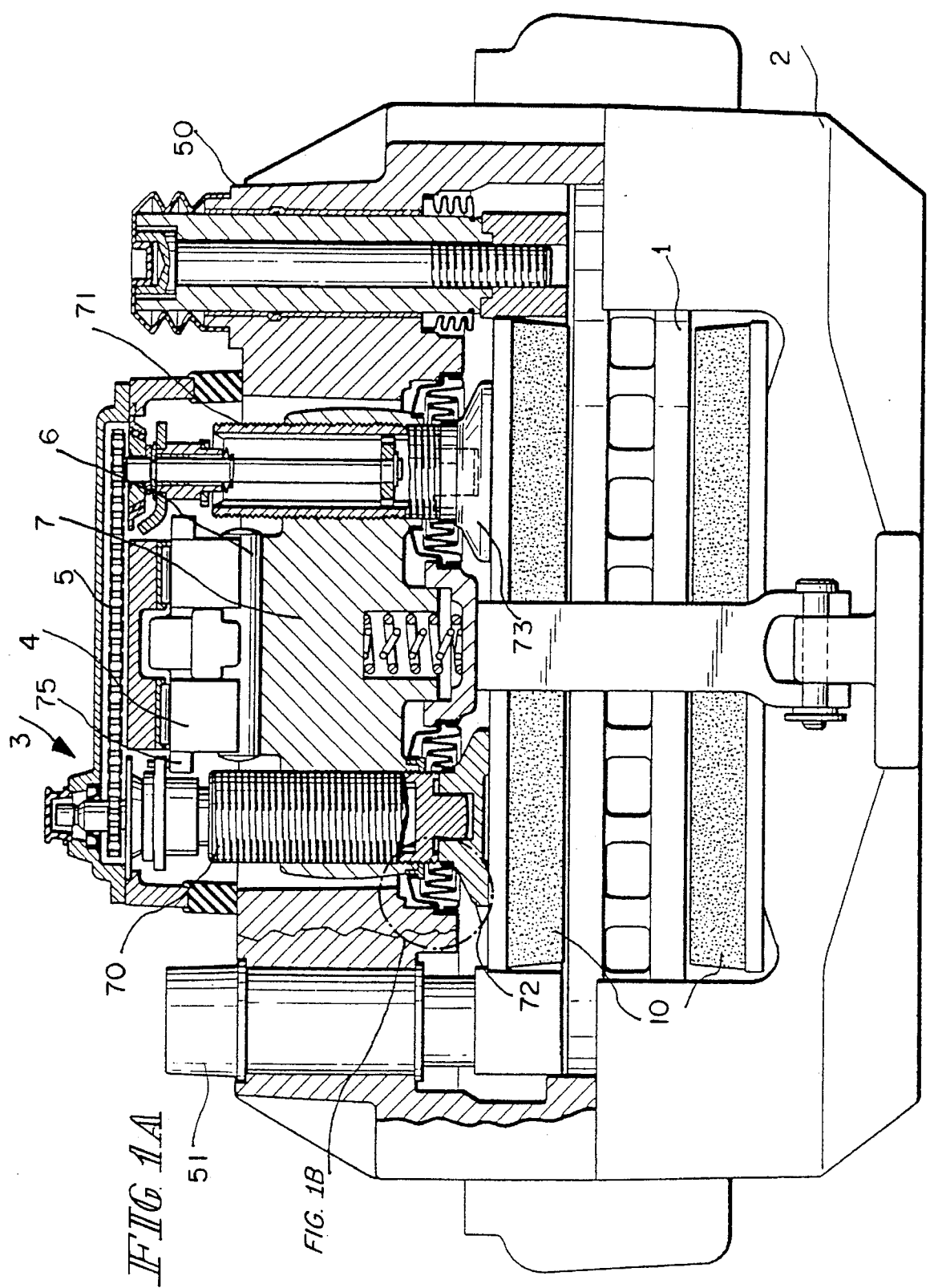

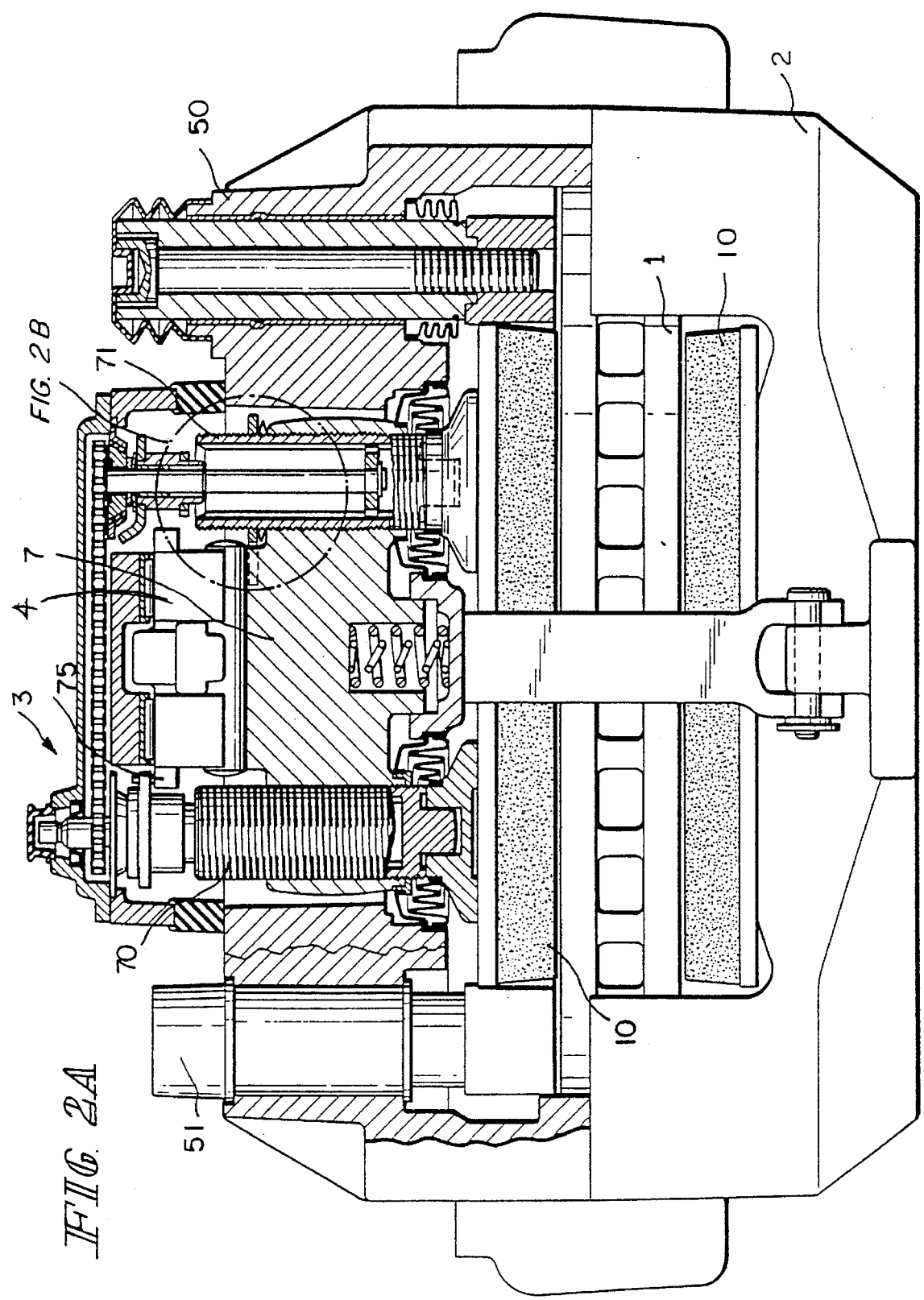

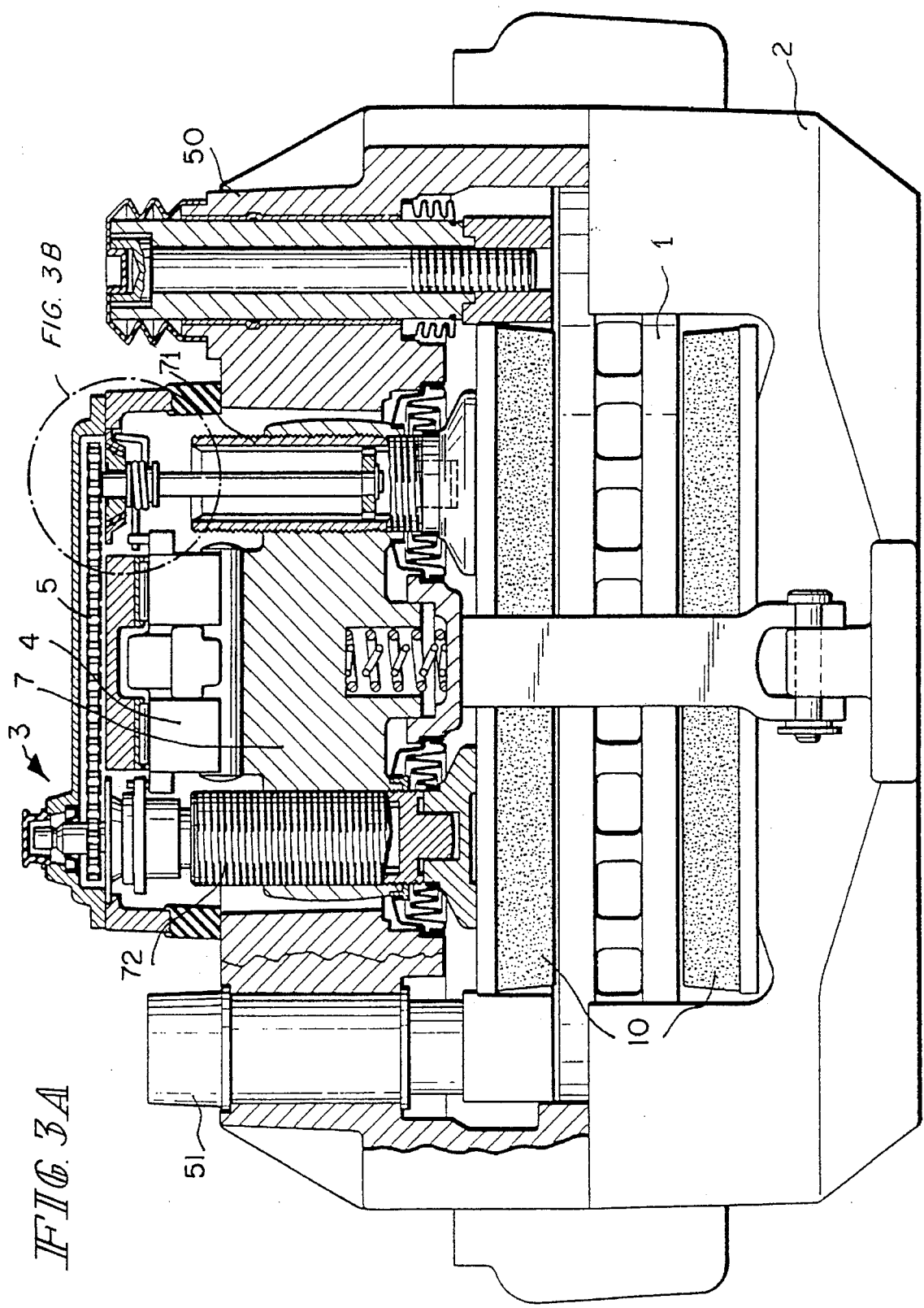

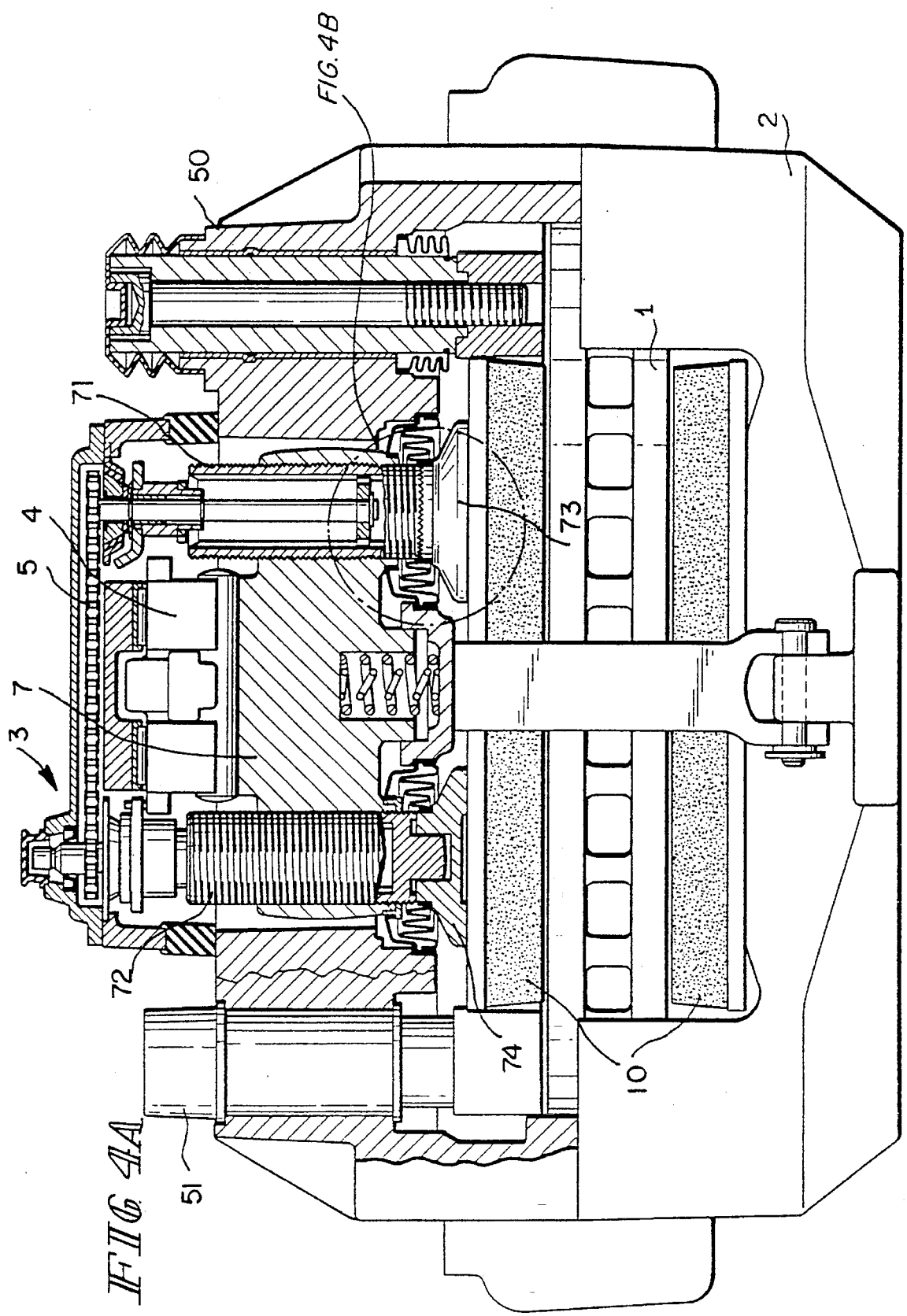

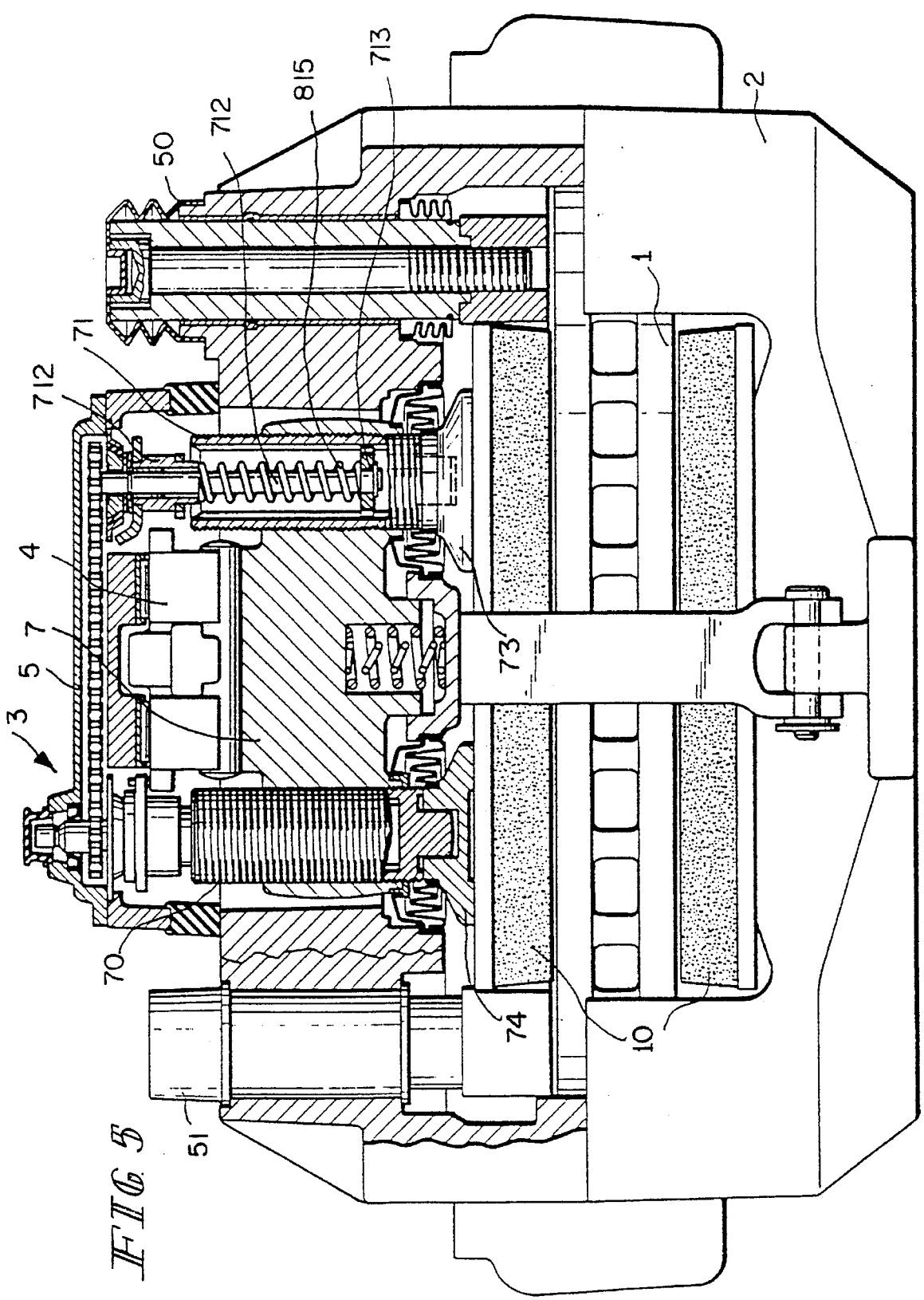

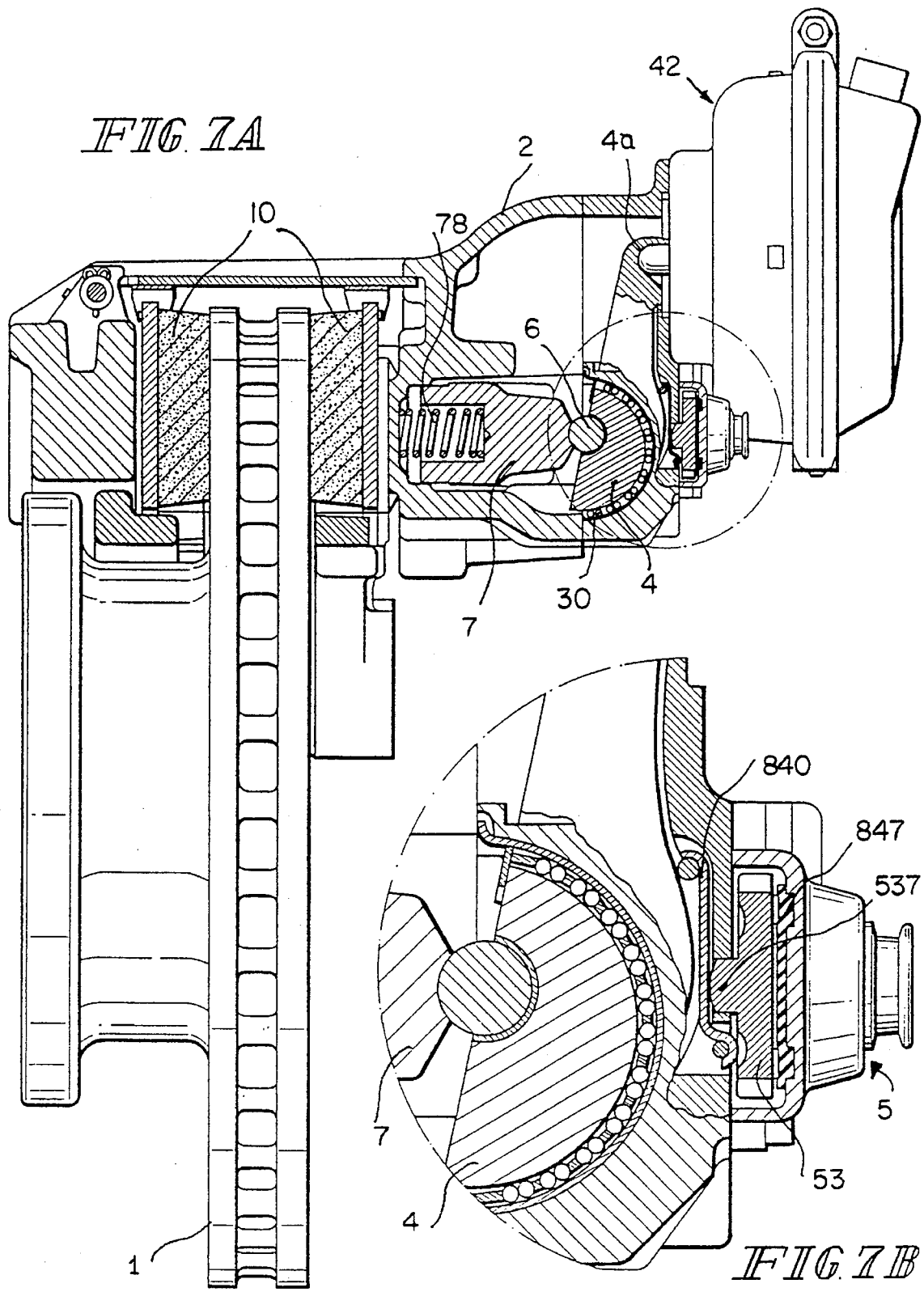

PNEUMATICALLY OPERATED DISK BRAKE

This is a continuation of application Ser. No. 08/295,420, filed Aug. 25, 1994, now abandoned.

BACKGROUND AND SUMMARY OF THE INVENTION

The present invention relates to a pneumatically operated disk brake which is provided particularly for commercial road vehicles.

Pneumatically operated disk brakes or pneumatic disk brakes of the above-mentioned type are known, for example, from German Patent Document DE-OS 37 16 202, from German Patent Document DE-OS 40 32 885 as well as from German Patent Document DE-OS 42 12 384 which is no prior publication. In the case of these known disk brakes, a caliper which is disposed to be slidable in the axial direction reaches around a brake disk. On one side of the caliper, a pneumatically operated application device is arranged. When this pneumatically operated application device is actuated, a brake shoe situated on this side of the brake disk is pressed against the corresponding friction surface of the brake disk. As a result of the reaction forces, the caliper will be displaced in the opposite direction and will therefore press a brake shoe which is situated on the opposite side also against the brake disk.

In the case of these known disk brakes, the application device has a rotary lever which operates as an actuating element and which is disposed to be swivellable about an axis of rotation which extends in parallel to the plane of the brake disk. On its side facing the brake disk, the rotary lever rests via an eccentric approximately in the longitudinal center against a traverse member which extends in parallel to the axis of rotation and which is guided to be slidable with respect to the brake disk. Two adjusting spindles with an external thread are screwed in an adjustable manner into a respective assigned internal thread of the traverse member in a parallel arrangement. Because two adjusting spindles are used, an application device of this type is also called a "two-spindle application device".

The two adjusting spindles each act via a pressure piece disposed on their brake-disk-side end on the brake shoe disposed in a slidable manner with respect to the brake disk on the application side in the caliper. The ventilating play, which changes because of the wear of the lining, constantly maintains its correct desired value by at least one adjusting device. The adjusting device is coupled in an axially displaceable manner but rotationally fixed with one of the two adjusting spindles and acts, during each actuating of the rotary lever, via a sliding clutch on the respective adjusting spindle. The rotation of the adjusting spindle which is caused by the adjusting device in the case of a wear of the lining is transmitted by a synchronization device to the second adjusting spindle such that this adjusting spindle is rotated about the same angle and therefore reduces its distance to the brake disk by exactly the same amount.

In the simplest case, only one driving device is arranged in the second adjusting spindle, which driving device couples this adjusting spindle in a rotationally fixed manner with the synchronization device. The driving device may be, for example, a gearwheel which engages in an internal axial toothing of the adjusting spindle, which gearwheel is coupled via a shaft with the synchronization device. However a separate adjusting device may also be provided for the second adjusting spindle. In this case, adjusting forces can be achieved that are twice as high which, however, is connected with correspondingly higher manufacturing costs.

When only one adjusting spindle is present ("single-spindle" application device) the synchronization device is naturally eliminated.

As mentioned above, the precise adjustment of a constantly uniform ventilating play is very important for the secure and reliable functioning of the disk brakes of this type. Although the adjusting devices which were developed by the Assignee of the applicant operate in a reliable and highly precise manner (reference is made in this respect, for example, to German Patent Document DE-OS 40 34 165 corresponding to U.S. Pat. No. 5,353,896 of the Assignee of the applicant) it has been found difficult in practice to maintain the ventilating play in the desired tolerance range. In particular, in practice, an undesirable reduction of the ventilating play will frequently occur so that the brake may even tend to lock.

The invention is therefore based on the object of further developing a pneumatically operated disk brake such that a constantly large ventilating play can always be achieved.

According to the invention, this object is achieved by providing a device which prevents any rotation of the adjusting spindle up to a defined torque.

Detailed tests have shown that the ventilating play changes, despite the correct functioning of the adjusting device, since the respective adjusting spindle, when subjected to extensive shaking stress, has the tendency to automatically or without any corresponding torque admission by the adjusting device, to rotate. The rotation is in the adjusting direction because the adjusting device, as a rule, has a directional clutch which prevents a rotation of the adjusting spindle against the adjusting direction. This undesirable rotational movement of the adjusting spindle or spindles is therefore the cause of the undesirable change of the ventilating play.

The invention therefore suggests that a device be provided which prevents any rotating of the threaded spindle or spindles up to a defined torque. As a result, any shaking stress which may occur in practice will definitely be unable to cause an undesirable rotation of the adjusting spindle or spindles so that the ventilating play will always remain constant. At the same time, when the torque is selected in an appropriate manner, the adjusting device is capable of rotating the adjusting spindle or spindles when there is a wear of the brake lining. In which case, the slightly increased torque which is required for this purpose presents no problems in the given force relationships and drive performances of the adjusting device.

According to the advantageous further development of the invention, the required braking torque for the respective adjusting spindle can be achieved, for example, an elastic element which acts upon the threaded surface of the concerned threaded spindle. The elastic element may, for example, be a friction ring made of rubber or the like which is fastened on the end of the corresponding threaded bore of the traverse member which faces the brake disk or is on the outside and whose inside diameter is smaller than the outside diameter of the threaded spindle. This arrangement is particularly simple and cost-effective, and furthermore has the advantage that an additional sealing is provided for the rust sensitive threaded surfaces of the adjusting spindle and of the traverse member. Naturally the mentioned friction ring may also be provided on the end of the bore which faces away from the brake disk or is on the inside; finally a simultaneous arrangement on the inner and outer end may also be advantageous.

According to the advantageous further development of the invention, the required braking torque for the respective adjusting spindle may as an alternative be achieved by a counternut which is disposed in a rotationally secured manner on the respective threaded spindle and is spring-loaded in the axial direction. This arrangement can also be provided in a very cost-effective manner and, in contrast to the previously explained embodiment, has the advantage that, also after an extended operating time, no replacement will be required so that its maintenance friendliness will be correspondingly high.

As an alternative, it is also possible to achieve the braking torque required for the respective adjusting spindle by a spring arranged in the force transmission path between the adjusting arrangement and the threaded spindle. The spring correspondingly increases the frictional torque of the force transmission path. This spring may, for example, be a coil spring which is wound around the drive shaft of the threaded spindle and which acts in the axial direction on a gearwheel disposed on the end of the drive shaft so that a corresponding braking torque is exercised on the force transmission which prevents the threaded spindle from automatically rotating. By this arrangement a countertorque is continuously exercised on the force transmitting elements of the synchronization device. Because of the achieved prestressing of the force transmitting elements, an increased wear of these elements is avoided during shaking stress.

As another alternative, the coil spring wound around the drive shaft of the threaded spindle may be designed such that it is fastened at its one end to the housing of the application device and at its other end is actuated by the rotary lever. The actuating of the respective end of the coil spring is constructed such that a torque is exercised on the drive shaft only in the released condition of the brake. This arrangement is therefore suitable where the adjusting device and/or the synchronization device are to be subjected in the operation to braking torques which are as low as possible or in the case of which a high efficiency is endeavored.

For a two spindle embodiment which includes a synchronization device for causing the synchronous adjusting rotational movement, the above-mentioned object of the invention may also be achieved in that a device is provided which locks the synchronization device in the released condition of the brake. Also in the event of a strong shaking stress or the like, the locked synchronization device prevents unintentionally rotation of the two adjusting spindles. A change of the ventilating play when the brake is released is therefore excluded under any circumstances.

When the synchronization device is formed essentially by several gearwheels, the endeavored locking of the synchronization device may be achieved, for example, by a disk formed from an elastomer material if care is taken that one of the gearwheels is pressed in the released condition of the brake against this disk in such a manner that the synchronization device is locked. It is possible, for example, to actuate a leaf spring by the rotary lever. The leaf spring presses the concerned gearwheel in the released condition of the brake against the disk.

However, when a type of synchronization device is provided in which a transmission device is used in the form of a link chain or of a toothed belt, it is recommended to cause the desired locking of the synchronization device by providing an element which is actuated by the rotary lever and which is disposed in a slidable manner. This element presses the link chain and the toothed belt in the released condition of the brake against a guide. For this purpose, a pin may be elastically fastened, for example, on the rotary lever. This pin projects into the housing of the transmission device and, when the rotary lever is actuated, releases the slidably disposed element. Thus, it is achieved in a space-saving and reliable manner that the adjusting spindles, which are coupled with a transmission device, do not rotate in an unintended fashion.

According to another independent aspect of the invention each adjusting spindle is provided on its brake—disk-side end with a frontal toothing which engages in a corresponding frontal countertoothing of its pressure piece. When the depth of the teeth of the frontal toothings is selected such that it corresponds to the desired ventilating play of the brake, the concerned adjusting spindle cannot rotate before the ventilating play is larger than this desired value. An unintended adjustment of the adjusting spindle or of the ventilating play during shaking stress is therefore excluded.

Other objects, advantages and novel features of the present invention will become apparent from the following detailed description of the invention when considered in conjunction with the accompanying drawings.

BRIEF DESCRIPTION OF THE DRAWINGS

FIGS. 1A and 1B are partial cross-sectional views of the construction of a first embodiment of the invention, FIG. 1B reflecting an enlarged partial view of FIG. 1A;

FIGS. 2A and 2B are corresponding representations of a second embodiment;

FIGS. 3A and 3B are corresponding representations of a third embodiment;

FIGS. 4A and 4B are views of another embodiment in which the clamping of the adjusting spindles takes place by a frontal toothing;

FIG. 5 is a view of a variant of the embodiment illustrated in FIG. 3;

FIGS. 7A and 7B are views of an embodiment which is suitable for a synchronization device with a train of gears.

DESCRIPTION OF THE PREFERRED EMBODIMENTS

Figure 3B:
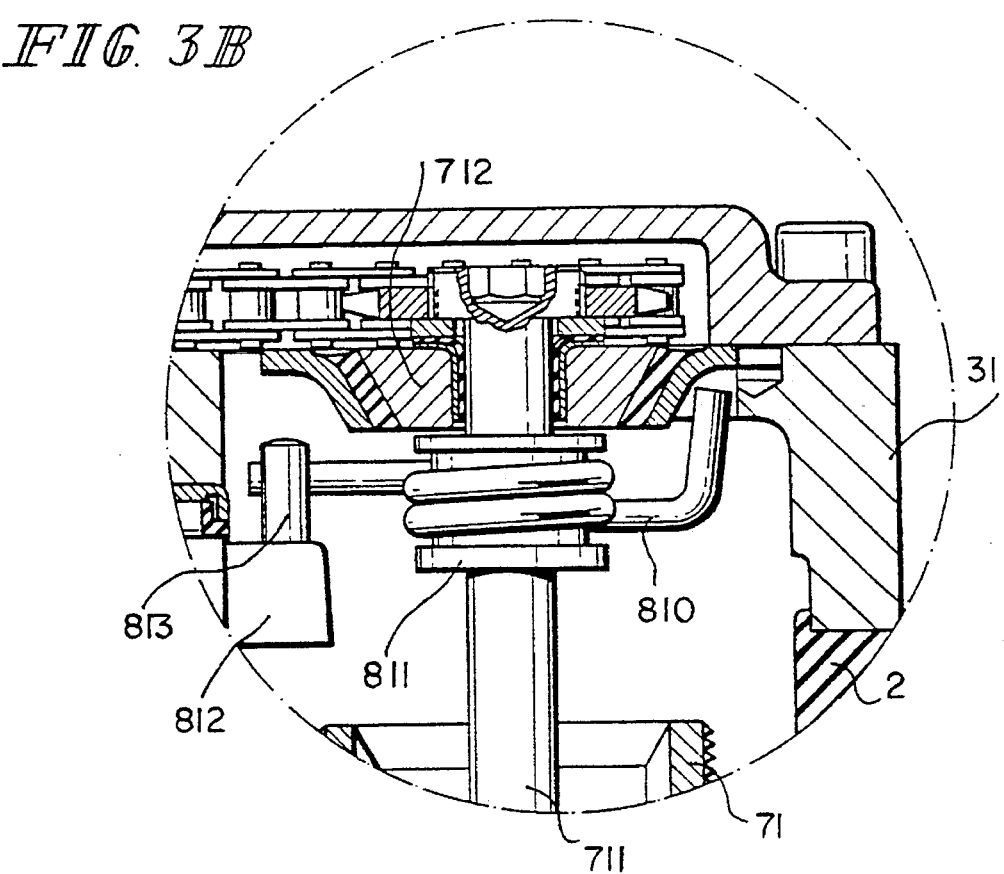

In order to illustrate the problems on which the invention is based, the basic construction and method of operation of the disk brake of the above-mentioned type and its application device will be explained in detail.

As illustrated in FIGS. 1A and 7A, a caliper 2 reaches around an (internally ventilated) brake disk 1 which is fastened to a axle of a commercial vehicle which is not described in detail. According to FIG. 1A, the caliper 2 is disposed by a rigid guide bearing 52 and a differential bearing 50 to move axially with respect to the brake disk 1 at the vehicle. The construction and function of the caliper are known so that they do not have to be explained in detail.

On the upper side of the brake disk, which is on the right in FIG. 7A and on top in FIG. 1A, a two-spindle application device is arranged, which diagrammatically has the reference number 3. In the caliper 2, an essentially semicircular pivot bearing 30 is provided whose axis of rotation extends in parallel to the plane of the brake disk 1 and which receives the correspondingly rounded area of a rotary lever 4 so that the rotary lever 4 can be swiveled in parallel to the plane of the brake disk 1. For actuating the rotary lever 4, a brake cylinder 42 is provided which is shown only diagrammatically, includes of a piston which engages in a suitably shaped recess of an actuating arm 4a of the rotary lever 4. When the brake cylinder 42 is acted upon by compressed air, the actuating arm 4a of the rotary lever is therefore moved from a shown inoperative position in the representation of FIG. 7A towards the left. It is noted that the actuating of the rotary lever 4 may naturally also take place by a brake linkage so that the brake cylinder 42 may optionally be placed at a different location if the installation space of the brake disk is limited.

The side of the rotary lever 4 which faces away from the half-shell-shaped pivot bearing 30 is coupled by an eccentric 6 serving as a cam with a traverse member 7. The traverse member 7 extends within the caliper 2 essentially in parallel to the axis of rotation of the brake disk 1 and is slidably disposed in this plane. On its end which faces the brake disk 1, the traverse member 7 has a blind-hole-type recess which is surrounded by a tube-shaped projection projecting in the direction of the brake disk 1. This projection of the traverse member 7 is slidably disposed in a corresponding recess of the caliper 2 at a right angle to the plane of the brake disk 1 while maintaining such a play that the traverse member 7 can carry out slight swivel movements in the plane of projection. Within the recess, a coil spring 78 is arranged which is clamped between the traverse member 7 and the end of the caliper 2 which faces the brake disk 1 and therefore prestresses the traverse member 7 in the direction of the rotary lever 4.

As illustrated particularly in the longitudinal sectional views of FIGS. 1A, 2A, 3A and 4A, the traverse member 7 has a bore which is provided on both sides with one internal thread respectively into which bore one adjusting spindle 70 or 71 respectively can be screwed in a adjustable manner. The adjusting spindle's external thread is guided in a correspondingly shaped internal thread of the traverse member 7. On the end of each of the adjusting spindles 70 and 71 facing the brake disk 1, a pressure piece 72 and 73 is fastened which widens in a conical manner. Since the two adjusting spindles 70 and 71 extend perpendicularly to the plane of the brake disk 1, the pressure pieces 70 and 73 rest by their flat ends against a brake shoe 10. Particularly in the circumferential direction of the brake disk 1, the brake shoe 10 is guided to be displaceable transversely to the brake disk 1 by holding devices which are not shown. The holding devices may be assigned either to the caliper 2 or to a brake anchor plate.

In the interior of the adjusting spindle 70, an adjusting device (which is not shown) is arranged which, because of an axial toothing, is non-rotatably coupled with the adjusting spindle 70 and is displaceable in the axial direction. The precise construction of a preferred embodiment of the adjusting device is described in the initially mentioned German Patent Document DE-OS 40 34 165 corresponding to U.S. Pat. No. 5,353,896 so that with respect to further details reference is made to the complete content of this document.

During each actuating of the rotary lever 4, the adjusting device is rotated by a certain angular amount, whereby a continuous adjusting of the brake is ensured. The exact construction of such a rotary drive device for the adjusting device is described in German Patent Document DE-OS 42 04 307 of the Assignee of the applicant so that with respect to further details reference is made to the complete content of this document. However, it should be pointed out that the type of rotary drive of the adjusting device is not important for the invention. It is only important that during each operating of the brake a sufficiently high adjusting torque is generated and is transmitted to the adjusting device.

Figure 2B:
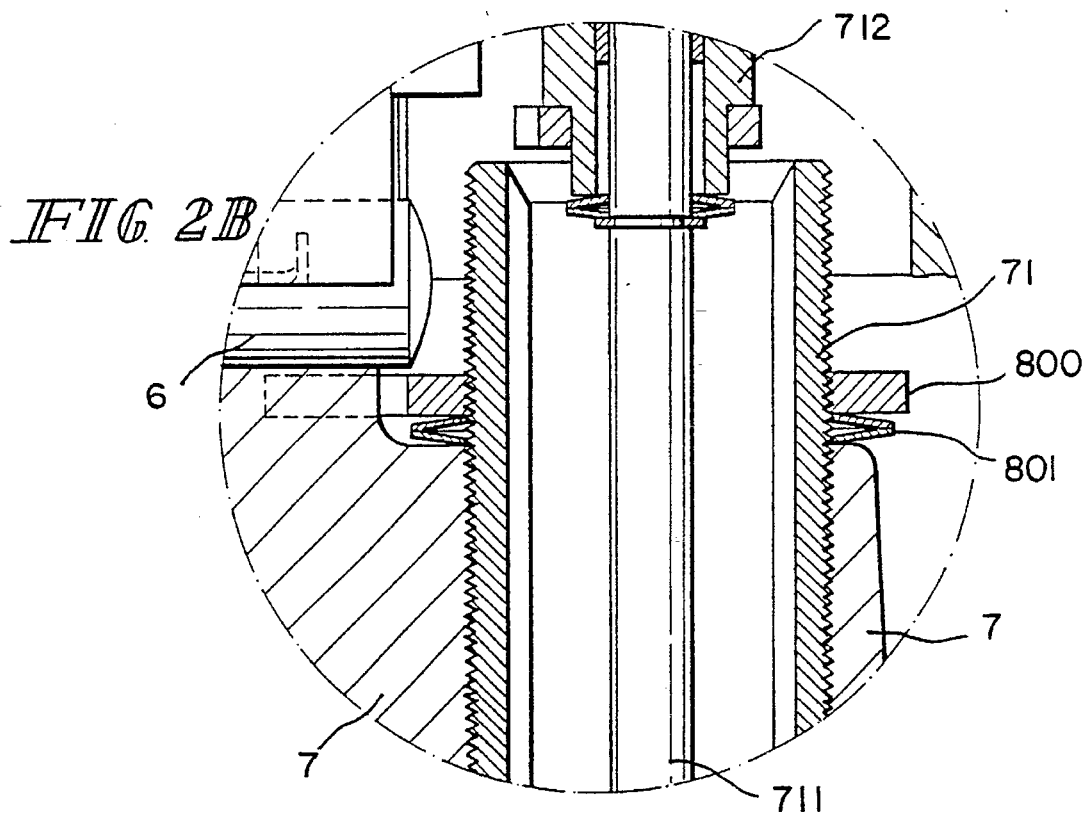

In the interior of the opposite adjusting spindle 71, no adjusting device is arranged but only a driving device which is formed of a gearwheel 713 (see, for example, FIG. 4B) which engages in a corresponding axial toothing of the adjusting spindle 71 and is fastened on a drive shaft 711 which is disposed in the housing in a bearing 712, which is illustrated in FIG. 2B. As was explained at the beginning, it is also possible as an alternative to provide in the adjusting spindle 71 an adjusting device which may have the advantage that the overall adjusting torque can be doubled. However this solution makes the application device more expensive so that preferably the driving device described here will be used.

For a better understanding of the method of operation of the application device according to the invention, its operating principle will be explained briefly in the following. When the brake cylinder 42 is acted upon by compressed air, the actuating arm 4a is swivelled to the left according to FIG. 7A, whereby the eccentric 6 operating at the rotary lever 4 is also displaced to the left by a distance reduced corresponding to the laws of leverage. For this reason, the traverse member 7 is pressed against the prestressing force of the coil spring 78 by this distance in the direction of the brake disk 1. The pressure pieces 72 and 73, which are fastened to the traverse member 7 by the adjusting spindles 70 and 71, overcomes the ventilating play (which in practice amounts to approximately 0.4 millimeters), and presses the brake shoe 10 against the brake disk 1. When the actuating arm 4a is swivelled farther towards the left, the caliper is displaced towards the right in FIG. 1 because of the force exercised on the brake disk 1 so that finally also the left brake shoe 10 is pressed against the brake disk 1. The external thread of the adjusting spindles 70 and 71 and the respective assigned internal thread of the traverse 7 member are dimensioned such that, when pressure is admitted, a self-locking occurs against the application direction. Thus, the adjusting spindles cannot move away in this direction and the brake pressure is maintained until the rotary lever 4 is released.

After the two brake shoes 10 are displaced by a predetermined distance corresponding to a desired ventilating play during brake application, the adjusting device is actuated by the rotary lever 4. If the ventilating play is adjusted correctly, the two brake shoes 10 will rest against the brake disk 1 at this point in time. For this reason, a sliding clutch provided in the adjusting device will respond so that the adjusting spindle 70 and the adjusting spindle 71 synchronized with it are not adjusted. When, on the other hand, an excessive ventilating play exists which occurs, for example, after a change of the lining or with an increasing wear of the brake shoes, the adjusting spindles 70 and 71 are rotated by the adjusting device by a certain distance and therefore bring the ventilating play, possibly also after a repeated operating of the brake, to the desired value. In this manner, it is ensured that the disk brake according to the invention remains operative up to a complete abrasion of the brake shoes 10.

In reference to FIGS. 1A and 1B, a first embodiment of the invention will be explained which prevents rotating movement of the adjusting spindles 70 and 71 even when subjected to a strong shaking stress or the like. Such a rotating movement would have the result that the brake shoe 10 facing the application device 3 would be pressed closer to the surface of the brake disk so that the ventilating play would be reduced correspondingly. In the worst case this reduction of the ventilating play could even lead to a locking of the disk brakes which must be prevented under any circumstances.

Figure 1B:
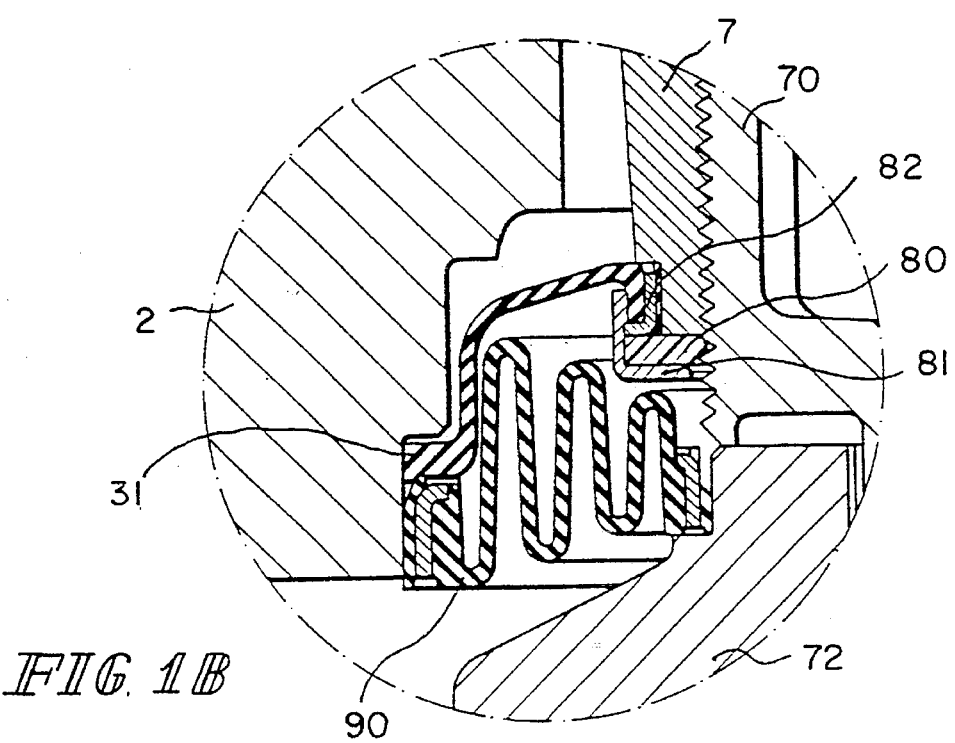

According to FIG. 1B which is an enlarged representation of the cutout illustrated in FIG. 1A, a friction ring 80 made of rubber or a similar elastomer material is fastened to the lower edge of the threaded bore of the traverse member 7 into which the respective adjusting spindle 70 and 71 is screwed. The inside diameter of this friction ring 80 is slightly smaller than the outside diameter of the adjusting spindle 70, 71. For this reason, the friction ring 80 exercises a frictional torque on the respective adjusting spindle which prevents rotation of the adjusting spindle automatically when stressed by shaking. An undesired change of the ventilating play can therefore be prevented in a secure manner.

According to the representation in FIG. 1B, the interior of the application device is protected by bellows 90 and an interior sealing lip 91 from the entering of water or dirt particles. The interior sealing lip 91 is fastened in a recess which surrounds the threaded bore of the traverse member 7 on its lower end. A surrounding clamping ring 82 is provided as a fastening element which securely holds the sealing lip 91. The clamping ring 82 has an additional angular part 81 which according to the representation in FIG. 1B is shaped such that a pocket is formed which receives the friction ring 80 according to the invention. It is therefore possible to securely and precisely place the friction ring 80 by the shown relatively minor modification of the fastening of the sealing lip 91. An additional sealing affect is also achieved.

Naturally, it is also possible to arrange the friction ring 80 on the outlet in the interior of the housing and on the respective adjusting spindle. Optionally, a double arrangement may be considered on the shown exterior as well as on the interior outlet of the adjusting spindle.

FIGS. 2A and 2B show another embodiment of the invention in which an automatic rotating of the adjusting spindle is prevented by a counternut 800. This counternut 800 is arranged slightly above the outlet of the adjusting spindle 70, 71 in the interior of the housing and is prevented from rotating by a projection, a recess of the like. The type and method of the respective rotational securing of the counternut 800 which is indicated by an interrupted line on the left-hand side of FIG. 2B is not important and can be modified arbitrarily. As also illustrated in FIG. 2B, the counternut 800 is prestressed in the axial direction by a disk spring 801. For this reason, a defined friction occurs between the internal thread of the counter nut 800 and the external thread of the shown adjusting spindle 71. This friction is defined by the spring force of the disk spring 801 which generates the corresponding braking torque. As explained, in the case of the above-explained friction ring 80, this braking torque is selected such that, on the one hand, an unintended rotation of the adjusting spindle can be prevented and that, on the other hand, the adjusting movement of the adjusting spindle is not excessively impaired.

The two above-described embodiments of the invention are based on the principle that the external thread of the respective adjusting spindle is acted upon by a suitable friction torque. In the following, FIGS. 3A and 3B as well as FIG. 5 describe two additional embodiments of the invention which are based on the principle of generating the braking torque to be exercised on the adjusting spindles by arranging a spring in the force transmission path between the adjusting device and the threaded spindle. The spring correspondingly increases the friction torque of the force transmission path.

In the embodiment of this variant of the invention illustrated in FIGS. 3A and 3B, a coil spring 810 is provided wound on a spindle 811 mounted on the drive shaft 711 of the threaded spindle 71. A first end, which is on the right in FIG. 3B, of the coil spring 810 is fastened in a recess of an upper housing part 31 of the application device and is prevented from rotating. The other or second end of the coil spring 810, which is illustrated on the left in FIG. 3B, rests against a pin 813 which is fastened to a projection 812 of the rotary lever 4. The coil spring 810 is dimensioned such and the position of the pin 813 is selected such that the coil spring 810 in the released condition of the brake, applies friction torque on the spindle 811 and therefore the drive shaft 711. By way of the gearwheel 713 disposed on the lower end of the drive shaft 711 (see FIG. 4B), the adjusting spindle 71 is therefore prevented from rotating automatically during a shaking movement or the like. The second adjusting spindle 70 is also prevented from rotating because the locking of the drive shaft 711 is transmitted by the synchronization device 5 implemented as a chain.

When the rotary lever 4 is actuated for the purpose of braking, the pin 813 fastened to it is swivelled in the same manner; i.e. towards the rear according to the representation of FIG. 3B. As a result, the coil spring 810 is finally relaxed to such an extent that it exercises no more friction torque on the spindle 811. At this point in time, the drive shaft 711 is freely rotatable so that, if required, the adjustment can take place without any problems.

FIG. 5 shows a variant of the above described embodiment in which a coil spring 815 is provided which is wound around the drive shaft 711 of the threaded spindle 71 and which acts in the axial direction on the gearwheel 713 disposed on the end of the drive shaft 711. Since, by means of its end facing away from the brake disk, the coil spring 815 rests against the bearing 712 of the drive shaft 711, the coil spring 815 generates an axial tension which exercises a corresponding friction torque on the interior surface of the gearwheel 713. As a result, the friction torque of the whole force transmission path from the adjusting device arranged in the left adjusting spindle 71 via the synchronization device 5 across to the right adjusting spindle 71 is increased to the same extent. As a result, it is also prevented that the two adjusting spindles are adjusted unintentionally when acted upon by shaking stress or the like. A change of the desired ventilating play is therefore also excluded.

In comparison to the above-described embodiment, the embodiment of FIG. 5 offers the additional advantage that, because of its rotational elasticity, the coil spring 815 causes a permanent return rotational affect which has the result that the corresponding transmission elements of the synchronization device 5 are permanently prestressed. Particularly when the synchronization device 5, as in the case of the embodiment shown in FIG. 7A, 7B, is formed of a train of gears in the form of several gearwheels, this prestressing has the effect that the transmission elements or gearwheels of the synchronization device 5 are also not subjected to increased wear when there is a high shaking stress.

All above-explained embodiments of the invention are based on the principle of applying a certain braking torque to the adjusting spindles 70, 71 at least in the released condition of the brake. When, on the other hand, a two-spindle application device 5 with a coupled synchronization device is provided, as in all embodiments of the invention, it is also possible as an alternative to provide a device which locks the synchronization device 5 in the released condition of the brake. Also in this manner, it is achieved that the two adjusting spindles cannot rotate automatically when stressed by shaking so that an unintentional change of the ventilating play is avoided. In the following, two preferred embodiments of this alternative principle of the invention are described. In this embodiment, the torque required to rotate the adjusting spindle when locked is substantial.

Figure 6C:
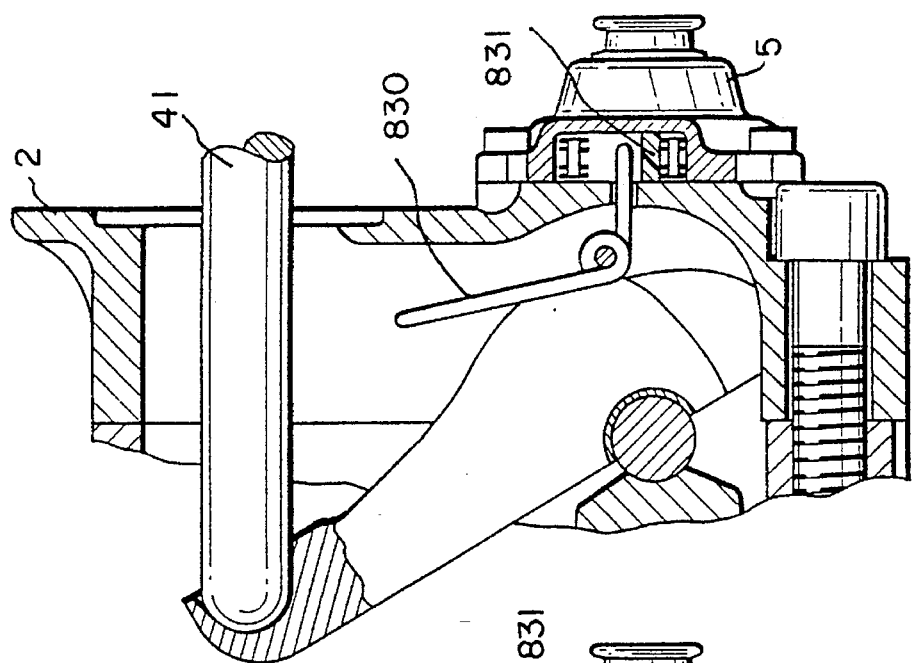
FIGS. 6A, 6B and 6C are views of an additional embodiment which is suitable for a synchronization device with a link chain.
Figure 6B:
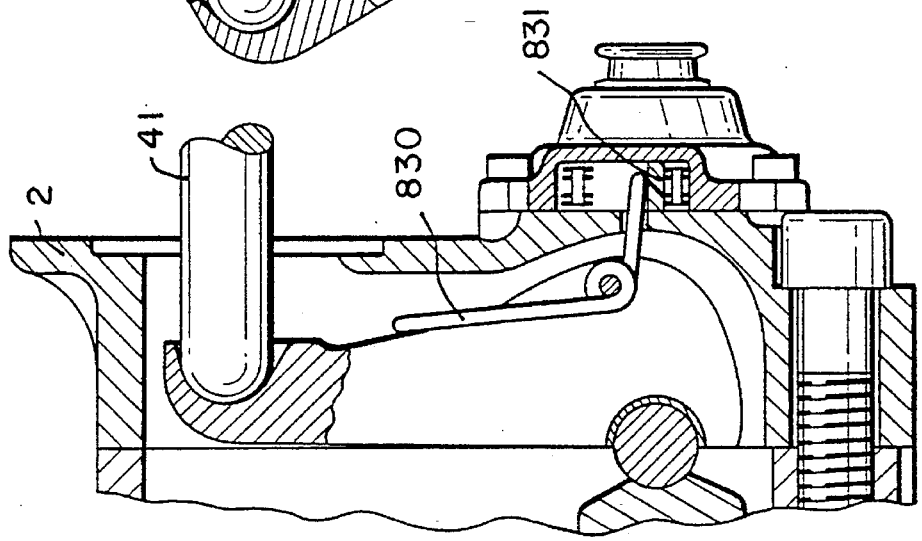
Figure 6A:
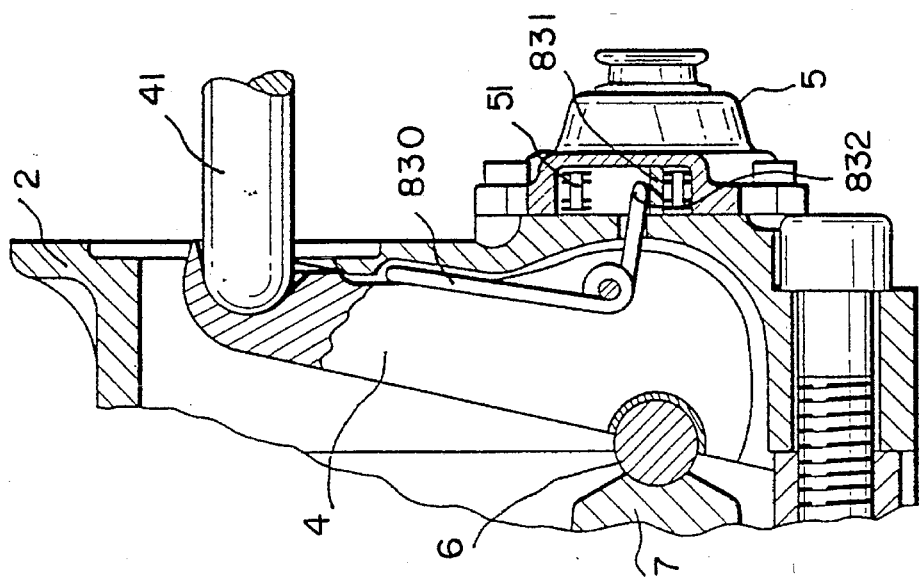

The first embodiment of this variant of the invention of FIGS. 6A to 6C, shows a synchronization device in which the force transmission takes place by a transmission device in the form of a link chain 51. As an alternative, a toothed belt or the like may also be used. According to FIG. 6A, a spring element 830 is fastened on the side of the rotary lever 4, which faces away from the brake disk. A pin shaped end 832 of the spring element 830 extends through a bottom-side opening of the synchronization device 5 and rests elastically on a displaceably disposed element 831. As illustrated in FIG. 6A, the displaceably disposed element 831, because of the spring force of the pin 832, presses the corresponding section of the link chain 51 against a wall or guide of the housing of the synchronization device 5. The link chain 51 is therefore clamped in so that it locks and prevents the adjusting spindles coupled with it from rotating.

When, according to the representation in FIGS. 6B and 6C, during the application of the brake, the rotary lever 4 is swivelled to its left by an actuating rod 41 of the brake cylinder, the pin-shaped end 832 of the spring element 830 releases the displaceable element 831 so that this element will no longer be spring-loaded. The clamping of the link chain 51 is therefore terminated so that the synchronization device can transmit a possibly required adjusting movement of the adjusting device.

Instead of the displaceable element 831, an elastic part may optionally be provided which, when the pin 832 is in contact, dents towards the link chain to such an extent that this link chain 51 is clamped therein.

FIGS. 7A and 7B show an embodiment which is provided for the locking of such a synchronization device in which the force transmission takes place by several gearwheels forming a train of gears. As illustrated particularly in FIG. 7B, the center gearwheel 53, for example, of the synchronization device 5 is rotatably disposed by a bearing journal 531 in a corresponding bearing bore. A leaf spring 840 is disposed on the end of the rotary lever 4 which faces away from the brake disk. This leaf spring 840 contacts in the illustrated released condition of the brake the lower end of the bearing journal 531, whereby the gearwheel 53 is acted upon by an outwardly directed axial pressure. On the side of the housing cover of the synchronization device 5 facing the exterior side of the gearwheel 53, a disk-shaped element 841 is fastened which is made of an elastomer material. Since the gearwheel 53 is provided on its exterior surface with a frontal toothing or the like, the gearwheel 53, because of the pressure exercised by the leaf spring 840, is braked by the elastomer disk 841. The synchronization device 5 is therefore blocked so that an unintentional rotation of the adjusting spindles is prevented. When the rotary lever 4 is swivelled to the left during the operation of the brake, the leaf spring 840 disengages from the lower end of the bearing journal 431 of the gearwheel 53, whereby the gearwheel 53 is no longer braked by the disk 841. The gearwheel 53 can therefore rotate in an unimpaired manner so that the synchronization device 5 can transmit a possibly required adjusting movement to another adjusting spindle.

The elastomer disk 831 may consist, for example, of a rubber material.

Figure 4B:
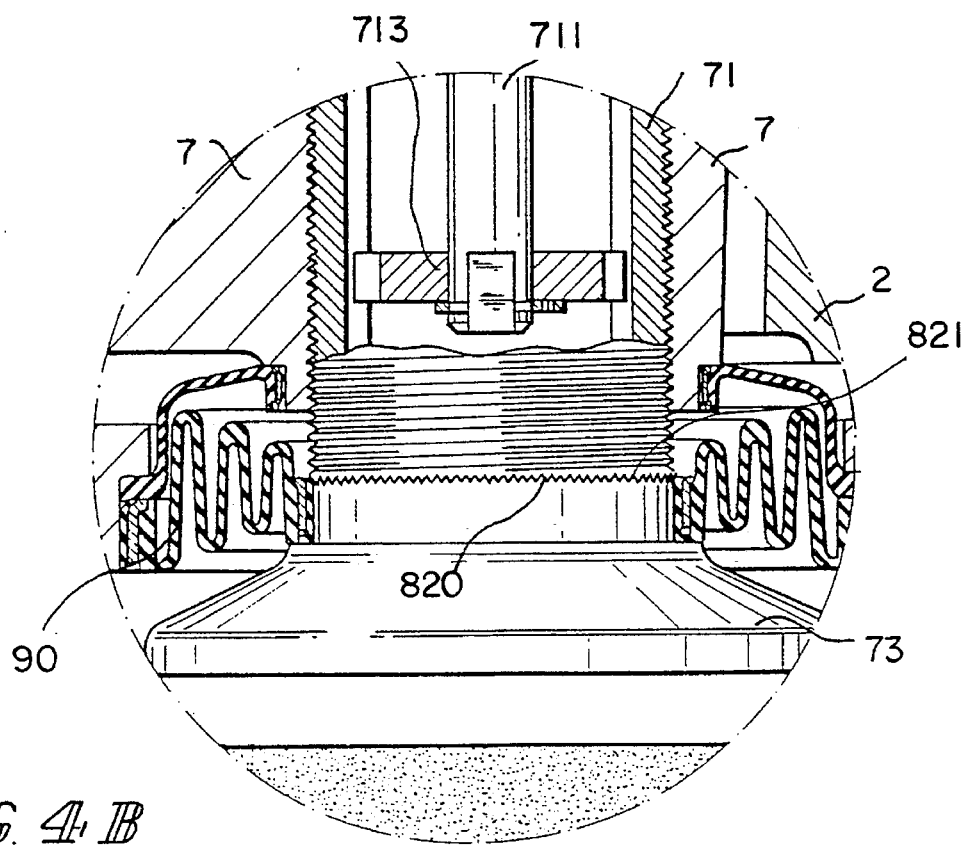

FIGS. 4A and 4B also show another embodiment of the invention in which the end of the adjusting spindle 71 on the side of the brake disk is provided with a frontal toothing 821 which engages in the corresponding frontal counter toothing 820 on its pressure piece 73. Because of its contact with the brake shoe 10 as well as because of the clamping-in by the bellows 90, the pressure piece 73 cannot rotate. Thus, the adjusting spindle 71 is also prevented from rotating so that during a shaking stress no unintentional adjustment of the ventilating play can take place. The tooth depth of the frontal toothing 820 and 821 is selected such that it corresponds to the desired ventilating play. When the ventilating play, because of the abrasion of the brake shoes 10, exceeds the desired ventilating play, the two frontal toothings will disengage when torqued so that the adjusting device can rotate the adjusting spindles for a new adjustment of the desired ventilating play. Also, during an extreme shaking stress a constant desired ventilating play will always exist. In this embodiment, the torque required to rotate the adjusting spindles is substantial.

In the embodiment of FIGS. 4A and 4B, the frontal toothing is provided only in the fight adjusting spindle 71 which is coupled by the synchronization device 5 with the left adjusting spindle 72. However, optionally it may also be considered to equip the left adjusting spindle 72 and its pressure piece 74 with a corresponding frontal toothing. Although, this is not absolutely required because of the coupling by the synchronization device 5.

Although the invention was explained for a two-spindle application device it may, with the exception of the embodiments aimed at the synchronization device 5, naturally also be used in a single-spindle application device.

The invention can also be used in a type of synchronization device in which a shaft is provided which extends essentially in the area of the axis of the eccentric and which has a conical gearwheel on each front side which mates with a corresponding conical gearwheel of the adjusting device so that a corresponding angle drive is formed. This shaft, which replaces the above- mentioned toothed belts or link chains requires no additional space so that the synchronization device can be installed in the interior of the application device without any significant influence on the space conditions. In this case, it is also possible to lock the shaft and therefore the synchronization by suitable possibly rotary-lever-actuated clamping devices, as required or in the released condition of the brake. With respect to further details of such a synchronization device, reference is made to the complete content of the applicant's Assignee's German Patent Document DE-OS 43 08 704.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:
1. A pneumatically operated disk brake comprising:
a caliper having a pair of brakes on each side of a brake disk;
an application device on a first side of said brake disk operable connected to by a lever to a traverse member which is slidably guided with respect to the brake disk;
two adjusting spindles adjustably screwed to the traversement and acting upon a brake shoe which is displaceably disposed with respect to the brake disk in the caliper on the first side;
an adjusting device acting upon at least one of the adjusting spindles to maintain the ventilating play essentially constant;

a synchronization device, separate of said adjusting device, for synchronizing adjusting rotation movement of said adjusting spindle; and a device for locking the synchronization device in the released condition of the brake to prevent rotating of the adjusting spindles.

2. A pneumatically operated disk brake comprising:

a caliper having a pair of brakes on each side of a brake disk;

an application device on a first side of said brake disk operable connected to by a lever to a traverse member which is slidably guided with respect to the brake disk;

two adjusting spindles adjustably screwed to the traversement and acting upon a brake shoe which is displaceably disposed with respect to the brake disk in the caliper on the first side;

an adjusting device acting upon at least one of the adjusting spindles to maintain the ventilating play essentially constant;

a synchronization device including several gearwheels for synchronizing adjusting rotation movement of said adjusting spindle; and a device including a disk formed of an elastomer material which is pressed against one of the gearwheels in the released condition of the brake for locking the synchronization device in the released condition of the brake to prevent rotating of the adjusting spindles.

3. A disk brake according to claim 2, wherein the lever actuates a leaf spring which presses the respective gearwheel against the disk in the released condition of the brake.

4. A pneumatically operated disk brake comprising:

a caliper having a pair of brakes on each side of a brake disk;

an application device on a first side of said brake disk operable connected to by a lever to a traverse member which is slidably guided with respect to the brake disk;

two adjusting spindles adjustably screwed to the traversement and acting upon a brake shoe which is displaceably disposed with respect to the brake disk in the caliper on the first side;

an adjusting device acting upon at least one of the adjusting spindles to maintain the ventilating play essentially constant;

a synchronization device including a transmission device having an endless loop for synchronizing adjusting rotation movement of said adjusting spindle; and a device including a displaceably disposed element which is actuated by the lever to press the endless loop against a guide in the released condition of the brake for locking the synchronization device in the released condition of the brake to prevent rotating of the adjusting spindles.

5. A disk brake according to claim 4, including a pin elastically fastened to the lever and projecting into the housing of the transmission device and said pin releases the displaceably disposed element when the lever is actuated.

* * * * *